United States Patent
Weinmann et al.

(10) Patent No.: US 6,929,019 B2
(45) Date of Patent: Aug. 16, 2005

(54) METHOD FOR THE PRODUCTION OF A VALVE

(75) Inventors: Michael Weinmann, Plüderhausen (DE); Gebhard Munz, Schorndorf (DE); Martin Maichl, Salach (DE); Andreas Münzenmaier, Esslingen (DE)

(73) Assignee: Festo AG & Co., Esslingen (DE)

( * ) Notice: Subject to any disclaimer, the term of this patent is extended or adjusted under 35 U.S.C. 154(b) by 0 days.

(21) Appl. No.: 10/787,902

(22) Filed: Feb. 26, 2004

(65) Prior Publication Data

US 2004/0177890 A1 Sep. 16, 2004

(30) Foreign Application Priority Data

Mar. 14, 2003 (DE) .......................... 103 11 238

(51) Int. Cl.⁷ .............................................. F15B 13/044
(52) U.S. Cl. ................ 137/15.21; 29/890.13; 137/625.44; 137/625.65; 251/129.06
(58) Field of Search .................. 137/15.21, 625.44, 137/625.65; 29/890.13; 251/129.06

(56) References Cited

U.S. PATENT DOCUMENTS

| 5,040,567 A | 8/1991 | Nestler et al. |
| 5,719,374 A | 2/1998 | Frackiewicz et al. |
| 5,857,491 A | 1/1999 | Cooke |
| 5,983,941 A | 11/1999 | Fritz et al. |
| 6,182,941 B1 | 2/2001 | Scheurenbrand et al. |
| 6,499,509 B2 | 12/2002 | Berger et al. |
| 2003/0070716 A1 | 4/2003 | Giousouf et al. |

FOREIGN PATENT DOCUMENTS

| DE | 697 18 097 T1 | 10/1997 |
| DE | 198 49 700 C2 | 5/2000 |
| DE | 199 57 953 A1 | 6/2001 |
| DE | 201 16 898 U1 | 1/2002 |
| EP | 11 581 82 | 11/2001 |

OTHER PUBLICATIONS

Abstract of Japanese Publication No. 01–313113, published Dec. 18, 1989.*

* cited by examiner

Primary Examiner—Gerald A. Michalsky
(74) Attorney, Agent, or Firm—Hoffmann & Baron, LLP (57) ABSTRACT

A method for the manufacture of a valve having at least one valve opening surrounded by at least one valve seat and an elongated valve member able to be brought into different positions by pivoting. In order to adjust the switching stroke of the valve member the valve member is, for instance using a laser, locally and briefly heated until superficial plastification occurs so that in the direction of the pivoting movement performed in operation it experiences a permanent flexural deformation.

17 Claims, 5 Drawing Sheets

METHOD FOR THE PRODUCTION OF A VALVE

BACKGROUND OF THE INVENTION

The invention relates to a method for the production of a valve, which comprises at least one valve opening surrounded by a valve seat and furthermore an elongated valve member able to be positioned by pivoting selectively into a closing position with a closure section resting on the at least one valve seat or into an open position clear of the valve seat.

THE PRIOR ART

For the control of fluid flows various different types of electrically operated valve are employed, which possess an elongated valve member, which is able to be switched over in a pivoting movement between different positions. The German patent publication 19,957,953 A1 describes such a valve in the case of which the valve member is constituted by piezoelectric flexural transducer which is held at one end thereof. The European patent publication 1158182 A1 describes a valve, which has a pivotally mounted rocker-like valve member and which by the action of a piezoelectric flexural transducer is able to be pivoted between its possible positions.

Owing to the presence of manufacturing inaccuracies of the components the production of such valves is relatively complex. More especially in the case of valves with very small dimensions and more particularly micro-valves, the manufacturing inaccuracies are very prone to have a size near the size of the switching stroke of the valve member so that it is extremely difficult to exactly set the desired switching stroke. The result may be a considerable amount of production rejects.

The said German patent publication 19,957,953 A1 has already disclosed biasing the valve member, which in the finally mounted state is held at one end, with a predetermined loading force acting toward the valve seat to be closed, prior to the final clamping or holding of the valve member in position. The complexity called for with such operations is however by no means insubstantial. Furthermore, this necessitates mechanically acting on the valve member by means of an external body providing the biasing force, something which more particularly in the case of very small and thin valve members may in certain circumstance lead to functional impairment.

SHORT SUMMARY OF THE INVENTION

One object of the present invention is to provide a method which irrespectively of manufacturing inaccuracies renders possible simple and simultaneously reliable production of a valve.

In order to achieve these and/or other objects appearing from the present specification, claims and drawings, in the present invention for adjustment of a switching stroke thereof the valve member is briefly locally heated for superficial plastification so that it experiences a permanent flexural deformation in the direction of its pivoting movement performed during operation.

Owing to the brief, locally limited incipient fusion of the valve member at its surface it is possible to ensure that the valve member is slightly flexed in the eventual direction of pivoting and permanently dwells in a final condition which is curved out of the initial state. Since the deformation is performed without the application of an external flexing force, it prevents damage to the valve member. Owing to exact metering of the input of energy causing the heating, exact adjustment is possible even in the case of extremely small dimensions of the valve members. There is the possibility of causing a permanent deformation of the valve member by suitably checked input of energy so that its closure section in the closed position is exactly planar and accordingly rests reliably on the associated valve seat.

The method in accordance with the invention may be employed both in the case of valves, whose valve member is directly formed by the operating member and also for those whose valve member is passive and which for switching are acted upon by an associated operating member. The method is more especially advantageous in connection with piezoelectric valves having at least one piezoelectric flexural transducer.

Further advantageous developments of the invention are defined in the claims.

For setting the intended switching stroke it is convenient, prior to commencing the thermal deformation operation and with the valve member installed its own valve housing, to check the actual switching stroke. The valve housing is in this case preferably open so that checking is readily possible. The result is then compared with the intended switching stroke, whereafter the deformation operation caused by incipient superficial fusion is performed.

After this it is convenient to perform a further check up of the actual switching stroke now achieved and the results of measurement are compared again with the intended switching stroke. If the desired value is still not reached, renewed heating may take place for the purpose of causing further deformation. This cycle is repeated until the intended switching stroke has been set within the permitted tolerance range.

In the case of serial production of a major number of similar valves a slightly modified method is an advantage. In this case the process takes place in a closed loop control circuit. After flexural deformation of a valve member the difference then existing between the actual switching stroke and the intended switching stroke is measured, this being followed not by further possible deformation of the checked valve member but of the next one in the series. This member is then heated in a manner modified to take into account the stroke difference detected, for example by changing the thermal intensity, by changing the heating cycles or the areas heated so that the intended switching stroke is produced at least with a better degree of approximation. The result of deformation is then remeasured and utilized as a basis for any recorrected heating of the following valve or, respectively, valve member. The particular advantage of this laser loop adjustment in a closed loop control circuit is that the adjustment is performed continuously to follow up the varying housing dimensions. Moreover, adjustment and checking are decoupled from one another, this leading to shorter cycle times.

The deformation of the valve member caused by the input of energy may be performed both before and after the installation in the associated valve housing.

The measurement in the actual switching stroke is preferably performed using a laser triangulator or some other optical distance measuring instrument.

The local heating of the valve member is preferably performed on at least one of the two longitudinal sides of the valve member, which are orientated in the pivot direction of the valve member, along which the valve member is eventually moved in operation. As a rule it is convenient and sufficient to perform heating on only one of the two longitudinal sides.

More especially in a fashion dependent of the degree of the desired bending it is also possible to perform the heating operation only once or several times over at the same or different points. Moreover the duration of energy input may be varied from case to case.

It is considered to be particularly convenient for the energy necessary for heating to be provided by irradiation of the valve member using a laser or some other high energy light source.

It is particularly advantageous for the method to be performed on a valve, whose valve member is pivoted for rocking and possesses two valve member arms, which project at opposite sides past the pivot bearing region, the first valve member arm forming a first closure section associated with one valve seat while the second valve member arm constitutes a drive section actuated for the purpose of switching the valve. As a modification it would be for example possible as well for the second valve member arm to constitute a second closure section in addition, which would be associated with a valve seat as well so that for example a 3/2 way valve would result.

Further advantageous developments and convenient forms of the invention will be understood from the following detailed descriptive disclosure of embodiments thereof in conjunction with the accompanying drawings.

DETAILED ACCOUNT OF WORKING EMBODIMENTS OF THE INVENTION

The valves 1 illustrated in drawing are more particularly suitable for the application of the method of the invention. However, the method may also be applied for valves with a different design.

Firstly there will be a description of a preferred structure of the valve 1 to be subjected to the method of the invention.

The valve 1 may have comparatively small dimensions so that it could be termed a micro-valve. More particularly in conjunction with valves with small and minimum dimensions advantageous application of the method is possible. However, it may be applied to valves of any dimensions.

Figure 1:
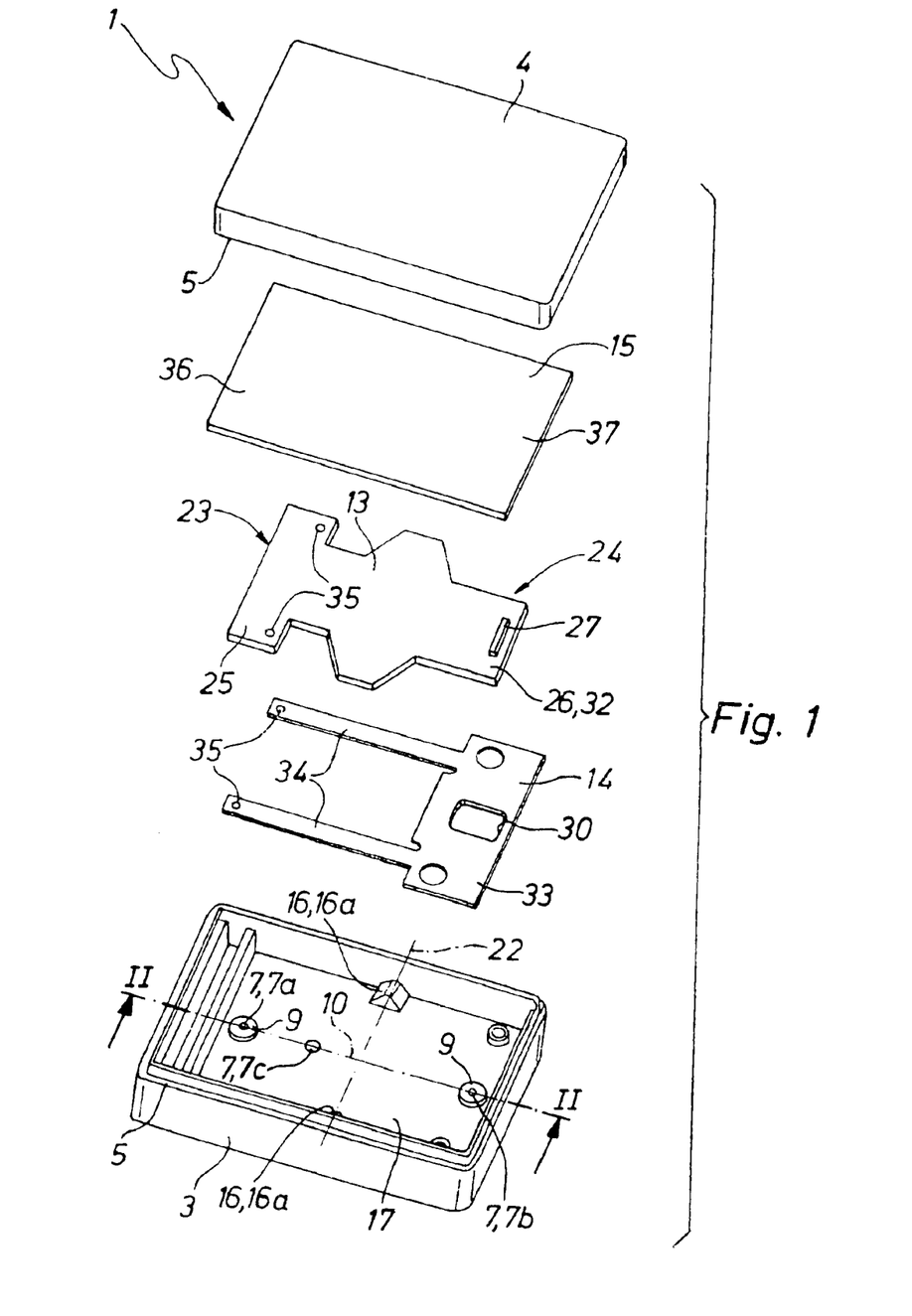
FIG. 1 shows an exploded view of a valve particularly suitable for the application of the method in accordance with the invention.

The valve 1 has a housing 2, which in the working embodiment illustrated is composed of a housing bottom part 3 and a housing cover 4 secured to it in a sealing fashion. These two parts are preferably produced by injection molding, more especially using plastic material. The connection in the joint region 5 is preferably performed by laser welding or by bonding. In the interior of the housing 2 a valve space 6 is delimited which is sealed from the outside.

The valve 1 of the working example is designed as a 3/2 way valve. Its valve space 6 has a plurality of valve ducts 7 opening into it which extend through the wall of the housing 2.

Two valve ducts 7, which open into the valve space 6 and are spaced apart, constitute a supply duct 7a adapted to be connected with a pressure source and a venting duct 7b to be connected with the atmosphere. The open ends, termed valve openings 8 of such valve ducts 7a and 7b are located in the housing bottom part 3 and are respectively surrounded by a valve seat 9 facing the housing cover 4.

In addition at least one further valve duct 7 is provided designed in the form of a power duct 7c, which opens at some convenient position into the valve space 6, the respective open end also being located on the housing bottom part 3 in this embodiment.

In the interior of the valve space 6 there are functional components of the valve 1. Such components comprise, in the working example, a moving valve member 13, a spring 14 and an operating member 15. The valve member 13 possesses an elongated form, it extending in the direction of the longitudinal axis 10 and being mounted in a pivoting manner like a rocker in the valve space 6. On the housing bottom part 3 bearing means 16 are provided defining a pivot region with a pivot axis 22 extending at a right angle to the longitudinal axis 10 in respect to which the valve member 13 can rock to and fro like a see-saw. Preferably the bearing means 16 are constituted by two bearing spurs 16a extending upward from the floor 17 of the housing bottom part 3, which could be termed knife edge bearings and on which the valve member 13 rolls during pivoting.

The valve member 13 possesses first and second valve member arms 23 and 24 extending from the pivot axis 22 in opposite directions. The first valve member arm 23 has a first closure section 25 extending over the valve seat 9 of the supply duct 7a. On the side, which faces this valve seat 9, of the first closure section 25 a rubber pad 29 may be provided possessing good sealing properties.

The second valve member arm 24 defines a second closure section 26, which extend over the valve seat 9 of the venting duct 7b. On the side, facing the valve seat 9, of the second closure section 26 a rubber pad 29 may also be arranged.

The second valve member arm 24 furthermore forms a drive section 32. In this connection it may have a projection 27 protruding toward the housing cover 4.

Between the valve member 13 and the floor 17 of the housing bottom part 3 a spring 14 is arranged, which preferably is in the form of a leaf spring. It takes effect between the housing 2 and the valve member 13, it acting on the latter in such a manner that it thrusts the first closure section 25 toward the associated valve seat 9.

Preferably the spring 14 possesses a plate-like attachment 33, by which it is secured under the second valve member arm 24 to the floor 17 of the housing bottom part 3. Starting in this attachment section 33 there extend two spring arms 34 underneath the one valve member arm 33, on which they are secured, for example by laser welding, at the indicated attachment positions 35, and owing to their deflection—they are lifted from the floor 17—a tension force is exerted by them in the above mentioned direction on the first valve member arm 23. It will be clear that in this case a different number of spring arms 34 is possible.

A recess 30 in the attachment part 33 allows the valve seat 9, which belongs to the venting duct 7b, to extend through.

The operating member 15 serves for setting the switching positions of the valve member 13. It is best designed in the form of a flexural actuator which on activation is deflected to the side. It could for example consist of a memory metal. In the working embodiment it is formed by a piezoelectric flexural transducer.

The actuating member 15 has an elongated shape and extends over the valve member 13 along same. At a rear clamped section 36 the operating member 15 is fixed in relation to the housing. Starting from this clamped section 36 two electrical conductors, not illustrated, extend to the outside, by way of which an activating voltage may be applied.

Figure 2:
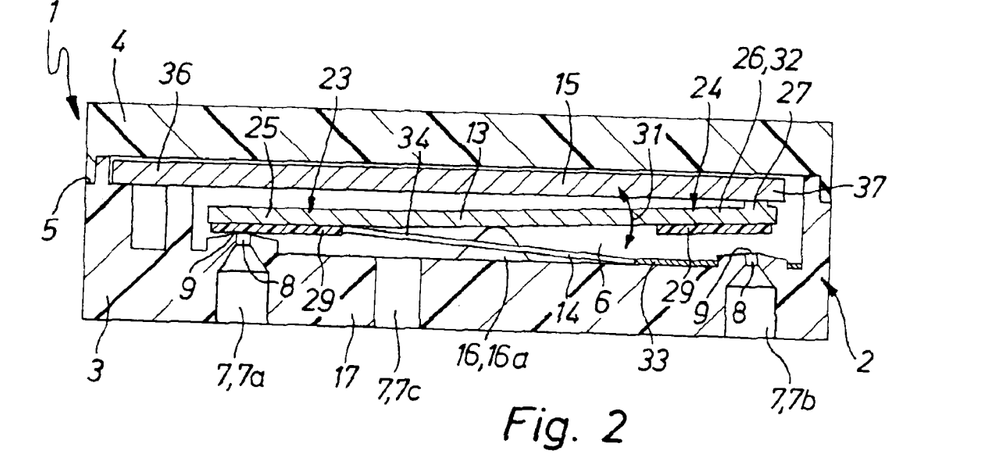
FIG. 2 is a longitudinal section taken through the assembled valve on the line II—II of FIG. 1 after adjustment of the valve member in accordance with the invention.

The front end region of the operating member 15 forms an actuating section 37, which extends past the drive section 32 of the valve member 13. In the finished state of the valve 1 ready for operation, the first closure section 25 assumes, when the operating member 15 is not yet activated, owing to the spring loading thereof, its closed position as shown in FIG. 2 wherein it engages the associated valve seat 9 and seals off the supply duct 7a in a sealing fashion. Simultaneously the second closure section 26 will be in an open position clear of the associated valve seat 9, so that the venting duct 7b is open toward the valve space 7c and by way of same is connected with the power duct 7c. The drive section 32 then engages the deactivated attachment member 15.

For switching the valve 1 the operating member 15 is activated by the application of a voltage. Its actuating section 37 is as a result bent toward the housing bottom part 3, it acting on the drive section 32 at the projection 27 and accordingly pivoting the valve member 13, against the restoring force of the spring 14, about the pivot axis 22. The pivoting motion ends when the second closure section 26 assumes the closed position closing the venting duct 7b. Simultaneously the first closure section 25 will be in an open position enabling flow through the supply duct 7a, so that the latter communicates by way of the valve space 6 with the power ducts 7c. The pivoting motion of the valve member 13 is indicated by a double arrow 31.

In the case of the valve as described there is the object of obtaining an exact, predetermined switching stroke between the two positions of the valve member 13, that is to say between the deactivated and the activated state of the operating member 15. At all times the operating member should also engage the valve member 13 in order to exclude the possibility of an idle stroke of the operating member 15.

It is however extremely difficult to meet this requirement. It is not unusual for manufacturing inaccuracies to exceed the height of the valve seats, the height of the bearing means 16, the height of the rubber pads 29 and the flatness of the valve member 13, designed a rocker, in the stroke region of the valve member so that manufacture in accordance with the desired process is not readily possible with the. With the manner of proceeding in accordance with the invention the above mentioned problems may be tackled and manufacture of the valve 1 in accordance with the desired process is possible, even in the case of small valve dimensions.

Figure 3:
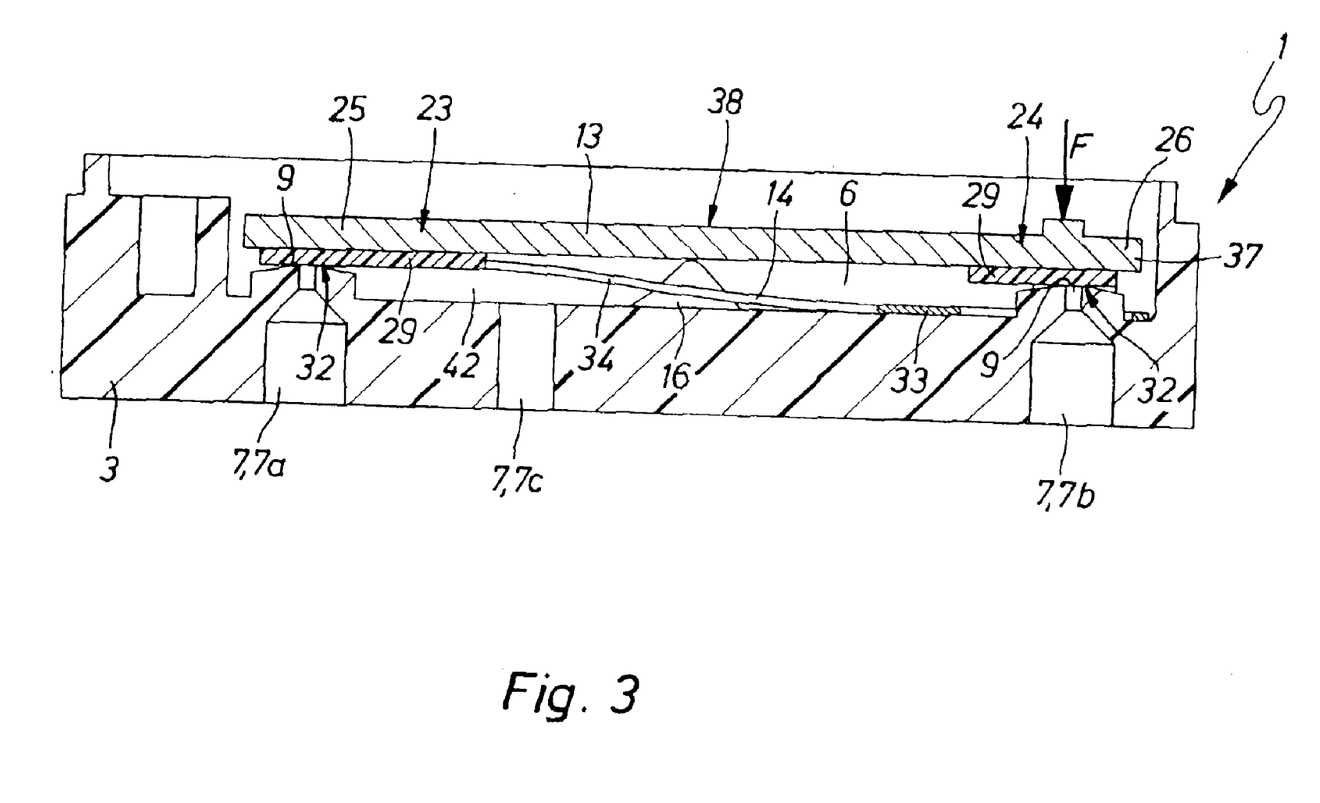
FIG. 3 shows the valve in accordance with FIGS. 1 and 2 in a longitudinal section view as in FIG. 2 but however after removal of the housing cover and before installation of the operating member and prior to heating producing permanent deformation by flexure.
Figure 4:
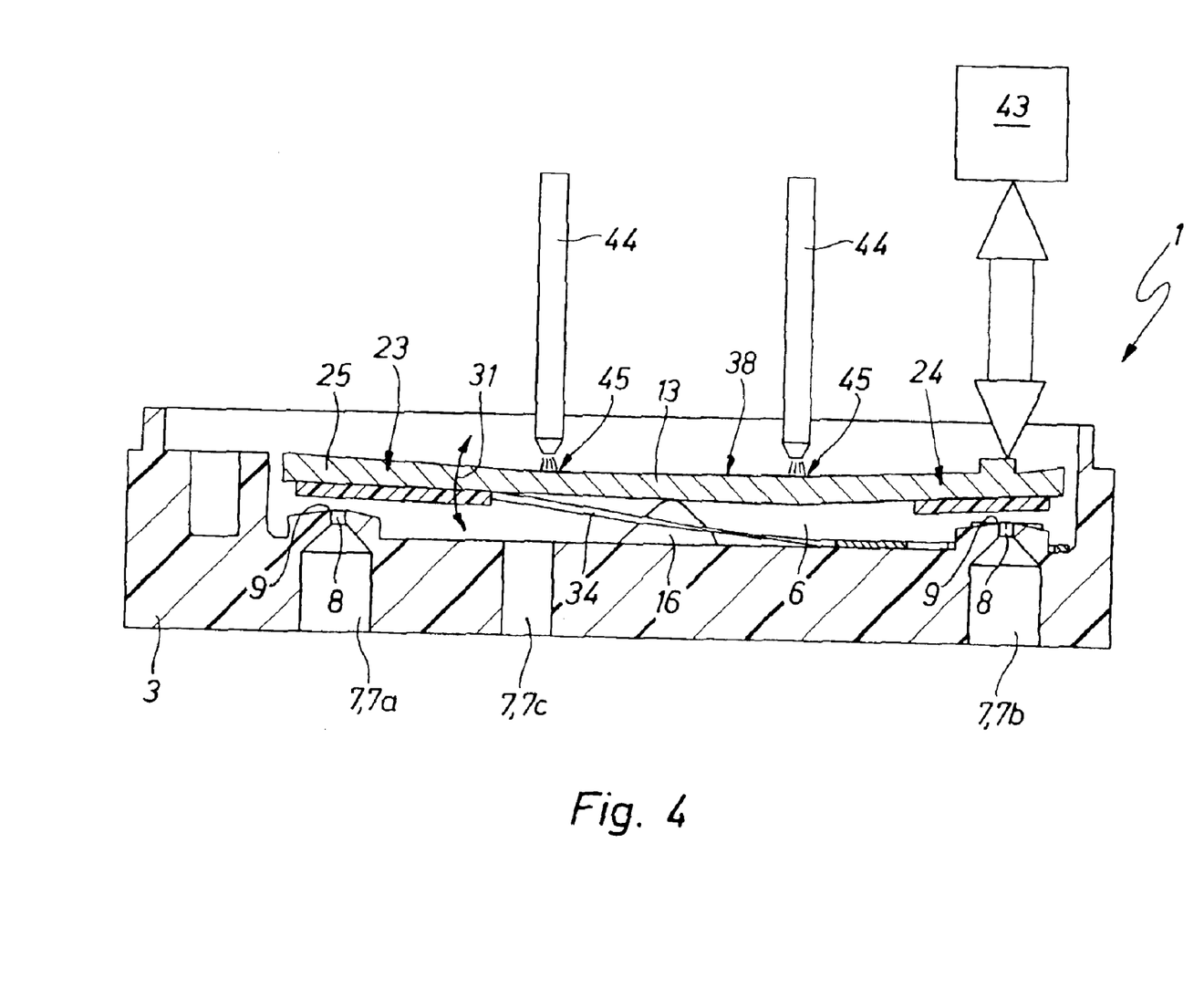
FIG. 4 shows the arrangement of FIG. 3 during adjustment of the valve member.
Figure 5:
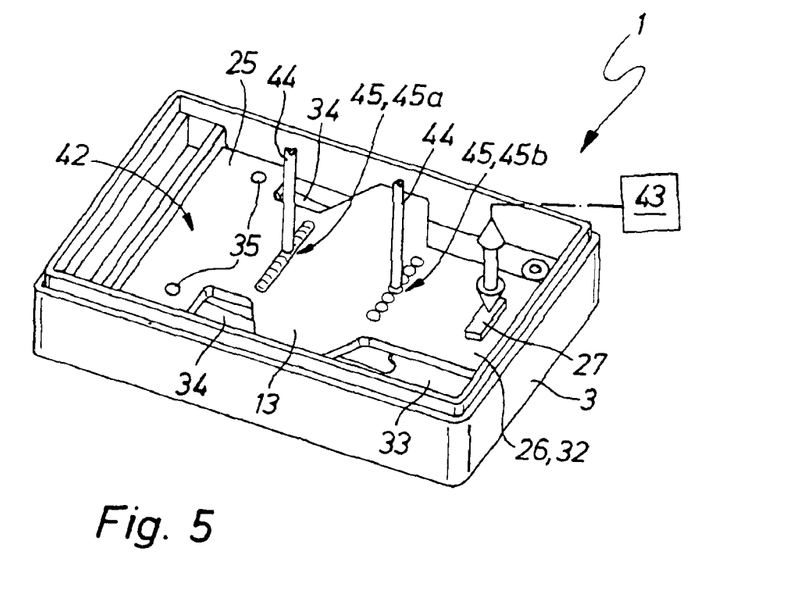
FIG. 5 shows the arrangement of FIG. 4 in perspective representation.

In the case of one possible type of the method, which is illustrated in FIGS. 3 through 5 the valve 1 is firstly so far assembled that the valve member 13 is installed together with the spring 14 in the valve housing 2. Then the top side, opposite to the floor 17, of the valve member 13 remains accessible, because the operating member 15 is not yet installed and the housing cover 4 is not yet put on. The valve member-spring combination 13 and 14 is accordingly seated in the housing bottom part, the valve member 13 resting on the bearing means 16 and the first closure section 25 being drawn by way of the spring 23, which is fixed to the housing bottom part 3 by way of the attachment part 33, into the closed position in engagement with the associated valve seat 9. Moreover the valve member 13 bears against the bearing means 16.

In the course of manufacture of the valve member 13 an attempt will be made to achieve a design which is as flat as possible. Taking into account the height of the preferably provided rubber pads 29 the design is preferably such that the valve member 13, not yet treated in accordance with the invention, in the switching position just mentioned (closed position of the first closure section 25) has the second closure section 26 resting on the valve seat 9 associated with it, or at least is only at a small distance from it.

The manufacture of a flat valve member is relatively simple to tackle from the point of view of process technology. It is therefore relatively simple to make a valve member, whose closure faces 32—that is to say the faces respectively resting in the closure position on a valve seat 9 and in the working in each case provided on the rubber pads 29—are aligned in a common plane. In the present method it is convenient for such valve members 13 to be employed as initial products.

After such a valve member 13, together with the spring 14, has been placed in the recess 42, contributing to forming the valve space 6, of the housing bottom part 3, in a preferred form of the method firstly the actual switching stroke of the valve member 13 is checked. This is performed by operating the valve member 13 on the actuating section 37 by the application of an external force F until the valve member 13 is switched over from the switching position determined by the spring 14—in the present case the closed position of the first closure section 25—into the other switching position, that is to say the closed position of the second closure section 25. Measurement may for example be optical using a laser triangulator, which is pointed from below toward the closing face 32. In principle however any type of measurement would be suitable in order to determine the actual switching stroke.

Since the desired switching stroke—termed the intended switching stroke—is known, then by a comparison between the actual switching stroke and the intended switching stroke the stroke difference is found using an electronic control means 43, on the basis of which the geometry of the valve member 13 is to be corrected.

After this the valve member 13 is, as indicated in FIGS. 4 and 5, locally heated by brief laser irradiation at 44 or some other source of energy. Heating preferably takes place on the longitudinal faces orientated in the pivoting direction 31 of the valve member 13, that is to say in the present case on the top side 38 of the valve member 13 facing toward the open side of the housing bottom part 3.

It is in this manner that the valve member 13 is subjected to incipient fusion in the irradiated region. During the following renewed solidification of the plastified superficial region 45 the valve member bends as far as possible, that is to say with the production of a concavity at the irradiated longitudinal side of the valve member 13. If therefore the valve member 13 is irradiated at the surface 38 there will be a flexing of the valve member 13, the closure sections 25 and 26 being flexed upwardly axially on either side of the plastified superficial region 45. The first and second valve member arms 23 and 24 in the working example up till now lying in one plane thus acquire a relative position, wherein, in the top side 38, same include an obtuse angle of less than 180°. The present flexural deformation, present after solidification of the plastified superficial region 45, of the valve member 13 is a permanent flexural deformation.

Owing to the input of energy controlled by the control means 43 it is possible to influence the dimensions of the plastified zone and consequently the permanent deformation as well.

Owing to such deformation the actual switching stroke of the valve member 13 will be changed. Such stroke is now larger than the initially measured stroke. With repeated measurement of the actual switching stroke and brief incipient fusion of the valve member surface the measurement and deformation cycle is repeated until the measured actual switching stroke is the same as the intended switching stroke.

As part of the method the valve member 13 is consequently locally heated for adjustment of its switching stroke until superficial plastification takes place so that it experiences a permanent flexural deformation in the direction of the operationally performed pivoting movement.

On a case to case basis the energy input per deformation operation may be caused by a single or a repeated heating of the valve member 13 with incipient fusion in each case. For instance a linear trace produced by the laser 44 is possible in order to get a linearly plastified superficial region 45a (FIG. 5). Furthermore a punctual or dot adjustment using separate laser bursts is possible, it thus being possible to produce a punctuate plastified superficial region (see again FIG. 5). In all case it is a question of a narrow, elongated plastified superficial region 45, whose longitudinal direction is at a right angle to the longitudinal direction of the valve member 13.

In order to have different adjustment angles the laser power and also the process speed, the number of irradiation dots the and/or the length of the plastified superficial region 45 may be varied.

The input of energy causing the flexural deformation as related to the longitudinal direction of the valve member 13 may be performed at only one or at several positions. Should only one position be treated, that section of the valve member 13 is recommended, which is near to the pivot axis 22. In the working embodiment irradiation is performed on either side of the pivot axis 22, that is to say in this case each valve member arm 23 and 24 is subjected to permanent flexural deformation.

The valve of the working example possesses a 3/2 way functionality. However, the method is also suitable for other valves such as those with a 2/2 functionality, which have only one closure section with an associated valve seat.

The irradiation of the valve member 13 could in addition or alternatively be performed on the bottom side. As a rule the side to be irradiated is selected in accordance with the existing basic shape of the valve member 13. For instance, irradiation of the bottom side could take place through the power duct 7c or the through some other opening in the housing not illustrated in detail, which is closed off following the irradiation operation in a sealing fashion.

If the valve member 13 is irradiated at several positions, the irradiation may takes place simultaneously or in sequence.

After adjustment of the valve member 13 the operating member 15 is installed and following this the housing cover 4 is put on and sealed off so that the valve 1 is now finished and complete.

Figure 6:
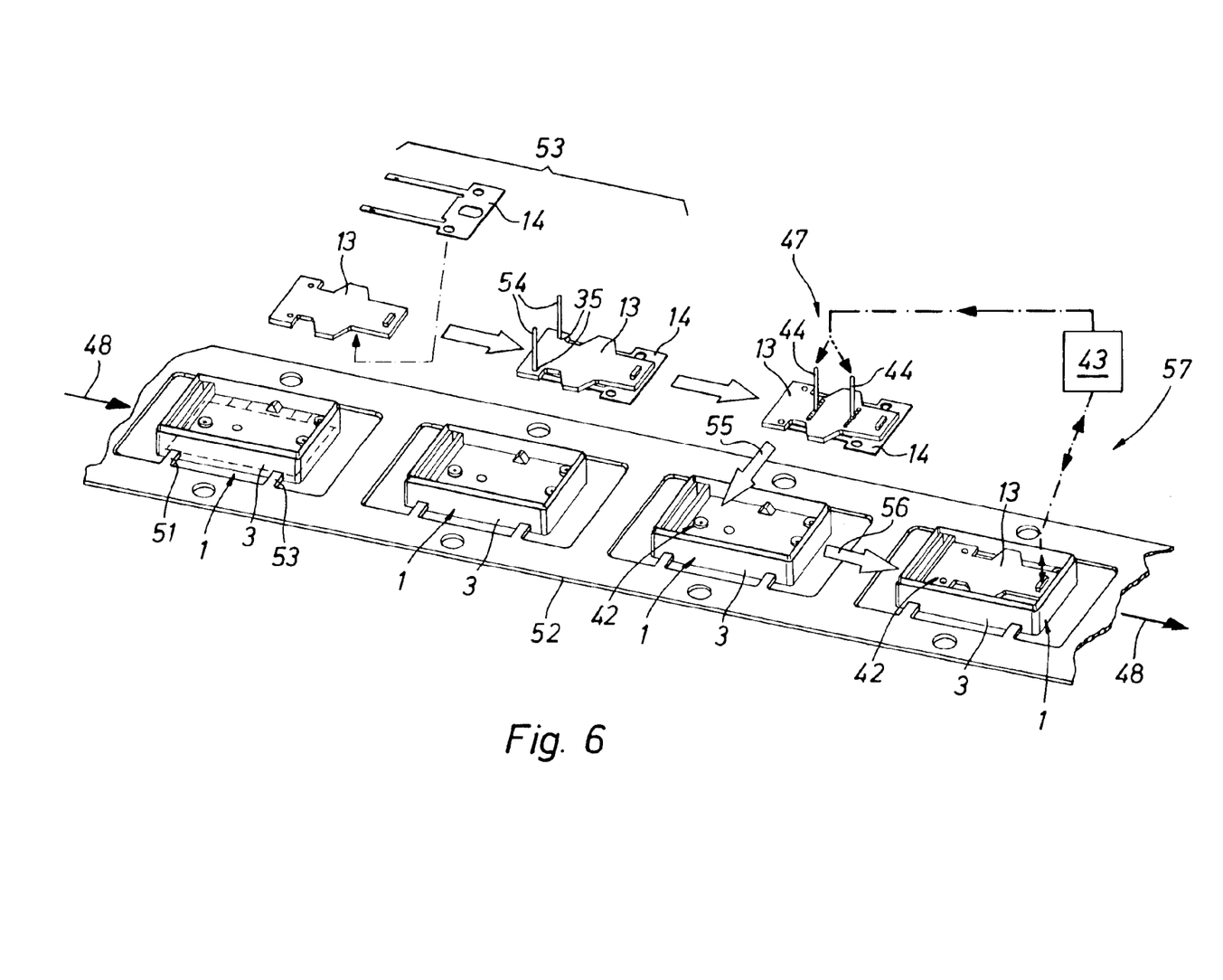
FIG. 6 shows a plant for the serial production of valves, the valve members being adjusted in a closed loop control circuit for setting their switching strokes.

A modified version of the method described is indicated in FIG. 6. Although the basic method remains the same as that described above, in this case adjustment of the valve member 13 is not performed in the condition installed in the valve housing 2, but outside it in a special adjustment station 47. Such an operation is more especially to be recommended for the manufacture of a series of valves 1.

FIG. 6 shows several housing bottom parts 3 of the valves to be produced, such valves being conveyed in a row on a conveying means 48 with the same alignment. The recess 42 in the housing bottom part 3 is directed upward. Preferably the order of the housing bottom parts is the same as the order in which they were produced using a pressure casting machine.

For getting the correct alignment use is made of a strip-like carrier 52, which could be termed a "stamped band", on which the housing bottom parts 3 are fixed by way of neck ribs 51, later to be cut off.

Independently of the manufacture of the housing bottom parts 3 the joining together of the valve member 13 and the spring 14 is performed in an assembly station 53. The two parts are placed on top of each other and permanently connected together by means of a welding means 54 at the attachment positions 35.

The valve member-spring units 13 and 14 pass from the assembly station 53 to the adjustment station 47, where they are secured in a receiving means, not illustrated in detail, and where a flexural deformation of the valve member 13 is performed using one or more lasers 44. After this the valve member 13, so treated, is installed together with the spring 14 in one of the housing parts 3 as indicated by the arrow 55.

The housing bottom part 3 so assembled is moved into a checking station 57 as part of the conveying operation 48, see arrow 56. Here using an above mentioned checking means 43 the actual switching stroke of the valve member 13 is measured and compared with the stored intended switching stroke.

On the basis of the result of measurement the flexural deformation of the next valve member 13 to be adjusted is adapted in the adjustment station 47. In accordance with the measured difference, the irradiation intensity is for example increased or reduced in order to obtain a larger or lesser flexural deformation and/or the positions of irradiation are changed in accordance with their location and number.

When the valve member 13 after such treatment and installed in a housing bottom part 3 arrives at the checking station 57, the operation is repeated in order to perform a renewed correction as regards the next valve member 13 to be treated.

Thus there is a closed control loop, adjustment being continuously adapted to the varying housing dimensions. Adjustment and measurement are decoupled from each other, this being conducive to extremely short cycle times. Owing to the internal or closed loop control circuit of the adjustment station the valves, after a short run-in time, are always immediately adjusted to set the intended switching stroke.

The method may also be employed for valve 5, whose valve member is designed with the operating member in a unitary manner. One example for this is a piezoelectric valve having a piezoelectric flexural transducer, which is directly provided in order to selectively free or close at least one valve duct. In this case the above mentioned thermal treatment could be performed to set a predetermined force, with which the piezoelectric flexural transducer closes a valve opening in the deactivated state.

What is claimed is:

1. A method for the production of a valve, which comprises at least one valve opening surrounded by a valve seat and furthermore an elongated valve member able to be positioned by pivoting selectively into a closing position with a closure section resting on the at least one valve seat or into an open position clear of the valve seat, wherein for adjustment of a switching stroke thereof the valve member is briefly locally heated for superficial plastification so that it experiences a permanent flexural deformation in the direction of its pivoting movement performed during operation.

2. The method as set forth in claim 1, wherein before a deformation operation in the installed state in a respective valve housing the actual switching stroke of the valve member is checked and compared with the intended switching stroke in order then to perform a following deformation operation by local, brief heating.

3. The method as set forth in claim 2, wherein the actual switching stroke of the valve member is measured in a condition installed in a respective valve housing by switching over the valve member by the application of an external force.

4. The method as set forth in claim 1, wherein after one such deformation operation in a state installed in a respective valve housing the actual switching stroke is checked and compared with the intended switching stroke.

5. The method as set forth in claim 4, wherein in accordance with an actual switching stroke measured after a deformation any necessary further deformation operation is performed.

6. The method as set forth in claim 4, wherein in the case of the production of a series of valves on the basis of the difference, measured on a deformed valve member, between the actual switching stroke and the intended switching stroke the deformation of the valve member of a following valve is suitably adapted by modified thermal treatment.

7. The method as set forth in claim 1, wherein deformation of the valve member is prior to installation in a respective valve housing.

8. The method as set forth in claim 1, wherein deformation of the valve member is performed in a condition installed in a valve housing.

9. The method as set forth in claim 1, wherein the local heating is performed on at least one of the longitudinal sides of the valve member orientated in the pivoting direction.

10. The method as set forth in claim 1, wherein repeated heating of the valve member is performed.

11. The method as set forth in claim 1, wherein the valve member is heated at a plurality of positions.

12. The method as set forth in claim 1, wherein the energy necessary for such heating is produced by laser irradiation or irradiation using some other high-energy light source.

13. The method as set forth in claim 1, wherein such method is applied to a valve member having a plurality of closure sections with associated valve seats.

14. The method as set forth in claim 1, as applied to a valve which is provided with an adjustable operating member, which member may act on the valve member in order to predetermine its switching setting.

15. The method as set forth in claim 1, wherein such operating member is a flexural actuator and more particularly a piezoelectric flexural transducer.

16. The method as set forth in claim 1, as applied to a valve whose valve member is adapted to pivot like a rocker with two arms and on either side of the pivot axis region and possesses a respective valve member arm, the first valve member arm constituting a first closure section associated with a valve seat, while the second valve member arm constitutes a drive section to be actuated by an operating section.

17. The method as set forth in claim 16, wherein the second valve member arm in addition to the drive section constitutes a second closure section associated with a further valve seat.

* * * * *